US009979708B2

(12) United States Patent
Roberts

(10) Patent No.: US 9,979,708 B2
(45) Date of Patent: *May 22, 2018

(54) ENCRYPTED COMMUNICATION BETWEEN PAIRED DEVICES

(71) Applicant: EMPIRE TECHNOLOGY DEVELOPMENT LLC, Wilmington, DE (US)

(72) Inventor: Michael John Roberts, Jamberoo (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/462,263

(22) Filed: Mar. 17, 2017

(65) Prior Publication Data

US 2017/0195302 A1 Jul. 6, 2017

Related U.S. Application Data

(63) Continuation of application No. 14/399,115, filed as application No. PCT/US2014/014398 on Feb. 3, 2014, now Pat. No. 9,603,015.

(51) Int. Cl.
*H04L 29/06* (2006.01)
*H04L 9/14* (2006.01)
(Continued)

(52) U.S. Cl.
CPC ........ *H04L 63/0492* (2013.01); *H04L 9/0861* (2013.01); *H04L 9/14* (2013.01);
(Continued)

(58) Field of Classification Search
CPC .......... H04L 63/0869; H04L 9/32; H04L 9/08; H04L 29/06; H04W 12/06; G06Q 20/341
(Continued)

(56) References Cited

U.S. PATENT DOCUMENTS 4,052,701 A * 10/1977 Leuschner ............. G08C 19/12
340/12.18
7,165,178 B2 * 1/2007 Gien ..................... G06F 21/645
705/67

(Continued)

FOREIGN PATENT DOCUMENTS

WO 2007011991 A2 1/2007

OTHER PUBLICATIONS

""CC1100/CC1150DK, CC1101DK, andCC2500/CC2550DK,Development Kit User Manual Rev. 1.4,"" Chipkon Products from Texas Instruments, accessed at http://www.ti.com/lit/ug/swru040c/swru040c.pdf, accessed on Mar. 15, 2017, pp. 24.
(Continued)

*Primary Examiner* — Farid Homayounmehr
*Assistant Examiner* — Sanchit Sarker

(57) ABSTRACT

In some examples, a device may include at least one communication interface configured to exchange signals with another device, and a pairable component configured to: assure the another device of mutual proximity by exchange of at least two progressively increasing locator signals and corresponding acknowledgement signals, receive executable validating code from the another device, execute the validating code, output a self-validating result of executing the validating code, verify pairing with the another device, and generate a secret key to ensure a private exchange of data between the mutually proximate, paired, and validated device and another device.

19 Claims, 10 Drawing Sheets

(51) Int. Cl.
*H04L 9/30* (2006.01)
*H04L 9/08* (2006.01)
*H04W 12/06* (2009.01)
*H04W 12/04* (2009.01)

(52) U.S. Cl.
CPC .............. *H04L 9/30* (2013.01); *H04L 63/06* (2013.01); *H04L 63/0869* (2013.01); *H04L 63/107* (2013.01); *H04W 12/04* (2013.01); *H04W 12/06* (2013.01)

(58) Field of Classification Search
USPC ................................................ 713/169, 270
See application file for complete search history.

(56) References Cited

U.S. PATENT DOCUMENTS

| | | | | |
|---|---|---|---|---|
| 7,424,541 | B2* | 9/2008 | Bourne | H04L 51/32 455/414.1 |
| 7,574,606 | B1* | 8/2009 | Fan | G06Q 20/32 713/179 |
| 8,270,609 | B2* | 9/2012 | Ma | H04L 63/0853 380/270 |
| 8,341,397 | B2* | 12/2012 | Leedom, Jr. | H04L 63/068 705/44 |
| 8,380,977 | B2* | 2/2013 | Son | H04L 63/0428 380/270 |
| 8,407,288 | B2* | 3/2013 | Thapa | H04L 45/00 370/468 |
| 8,427,304 | B2* | 4/2013 | Wike | G08B 21/24 340/531 |
| 8,457,552 | B1* | 6/2013 | Linsky | H04W 76/021 455/41.2 |
| 8,942,719 | B1* | 1/2015 | Hyde | G01S 5/0231 455/411 |
| 2005/0226201 | A1* | 10/2005 | McMillin | H04L 45/00 370/348 |
| 2005/0235159 | A1* | 10/2005 | Anandakumar | G06F 1/3203 713/185 |
| 2007/0204078 | A1* | 8/2007 | Boccon-Gibod | G06F 21/10 710/54 |
| 2009/0164813 | A1* | 6/2009 | Tu | H04B 1/1615 713/320 |
| 2012/0110327 | A1* | 5/2012 | Doerner | H04L 9/0825 713/165 |
| 2012/0128154 | A1* | 5/2012 | Ran | H04K 1/00 380/255 |
| 2013/0281021 | A1* | 10/2013 | Palin | H04W 8/005 455/41.2 |
| 2014/0380419 | A1* | 12/2014 | Peluso | H04W 12/06 726/3 |
| 2015/0185311 | A1* | 7/2015 | Lohier | G06F 21/88 367/118 |
| 2015/0358814 | A1* | 12/2015 | Roberts | H04W 12/06 713/169 |
| 2016/0140003 | A1* | 5/2016 | Panara | G06F 11/2017 714/6.21 |

OTHER PUBLICATIONS

"ElGamal encryption," Wikipedia, accessed on https://web.archive.org/web/20140407051429/http://en.wikipedia.org/wiki/ElGamal_encryption, Last modified on Mar. 30, 2014, pp. 3.

"Public-key cryptography," Wikipedia, accessed on https://web.archive.org/web/20140219085828/http://en.wikipedia.org/wiki/Public_key_cryptography, Last modified on Feb. 17, 2014, pp. 9.

Demirbas, M. and Song, Y., "An RSSI-based scheme for sybil attack detection in wireless sensor networks," International Symposium on a World of Wireless, Mobile and Multimedia Networks, pp. 564-570 (Jul. 2006).

Gamal, T. E., "A Public Key Cryptosystem and a Signature Scheme Based on Discrete Logarithms," Proceedings of CRYPTO 84 on Advances in cryptology, pp. 10-18 (Jul. 1985).

International Search Report and Written Opinion for International Application No. PCT/US14/14398, dated May 23, 2014, pp. 9.

Liu, Y., and Ning, P., "Mimicry Attacks against Wireless Link Signature and Defense using Time-Synched Link Signature," North Carolina State University. Dept. of Computer Science, vol. 11, No. 7, pp. 1515-1527(Mar. 11, 2016).

Mathur, S., et al., "ProxiMate: Proximity-based Secure Pairing using Ambient Wireless Signals," Proceedings of the 9th international conference on Mobile systems, applications, and services, pp. 14 (Jun. 28, 2011).

Mirayyan, S., et al., "Goldbach Conjecture Proof," Greener Journal of Science, Engineering and Technological Research vol. 4, No. 2, pp. 30-31 (2014).

Zhong, S., et al., "Privacy-Preserving Location-based Services for Mobile Users in Wireless Networks," pp. 1-13 (2004).

\* cited by examiner

ENCRYPTED COMMUNICATION BETWEEN PAIRED DEVICES

CROSS-REFERENCE TO RELATED APPLICATIONS

This Application is a Continuation Application under 35 U.S.C. § 120 of U.S. application Ser. No. 14/399,115 filed on Nov. 5, 2014, issued as U.S. Pat. No. 9,603,015, which is the U.S. National Stage filing under 35 U.S.C. § 371 of International Application No. PCT/US2014/014398 filed on Feb. 3, 2014. The International Application No. PCT/US2014/014398 and the U.S. application Ser. No. 14/399,115 are herein incorporated by reference in their entireties.

TECHNICAL FIELD

The embodiments described herein pertain generally to encrypted communication between paired devices.

BACKGROUND

Unless otherwise indicated herein, the approaches described in this section are not prior art to the claims in this application and are not admitted to be prior art by inclusion in this section.

The increase of functionality and downsizing of electronic components in wireless devices has enabled and facilitates simple communication therebetween in new and varied uses. However, current implementations of such communications are often poorly secured.

SUMMARY

In one example embodiment, a device pairing system may include a first device and a second device that are each configured to: assure each other of mutual proximity by at least exchanging at least two progressively increasing locator signals and corresponding acknowledgement signals, and mutually validate each other by: the first device sending executable code to the second device, the second device executing the executable code and returning a result to the first device, and the first device verifying the returned result; and by generating secret keys to ensure a private exchange of data between the mutually proximate and validated first device and second device.

In another example embodiment, a device may include at least one communication interface configured to exchange signals with another device, and a pairable component configured to: assure the another device of mutual proximity by exchange of at least two progressively increasing locator signals and corresponding acknowledgement signals, receive executable validating code from the another device, execute the validating code, output a self-validating result of executing the validating code, verify pairing with the another device, and generate a secret key to ensure a private exchange of data between the mutually proximate, paired, and validated device and another device.

In yet another example embodiment, a device pairing method includes outputting, by a first device, at least two progressively increasing locator signals; receiving, by the first device, an acknowledgement signal acknowledging receipt of one of the at least two progressively increasing locator signals; determining, by the first device, proximity of the first device to a second device based on the acknowledgement signal; receiving, by the first device, executable validating code; executing, by the first device, the validating code; outputting, by the first device, a self-validating result of executing the validating code; verifying, by the first device, pairing the first device with the second device; and generating, by the first device, a secret key based on the proximity, self-validating result, and pairing to ensure a private exchange of data between the first device and the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
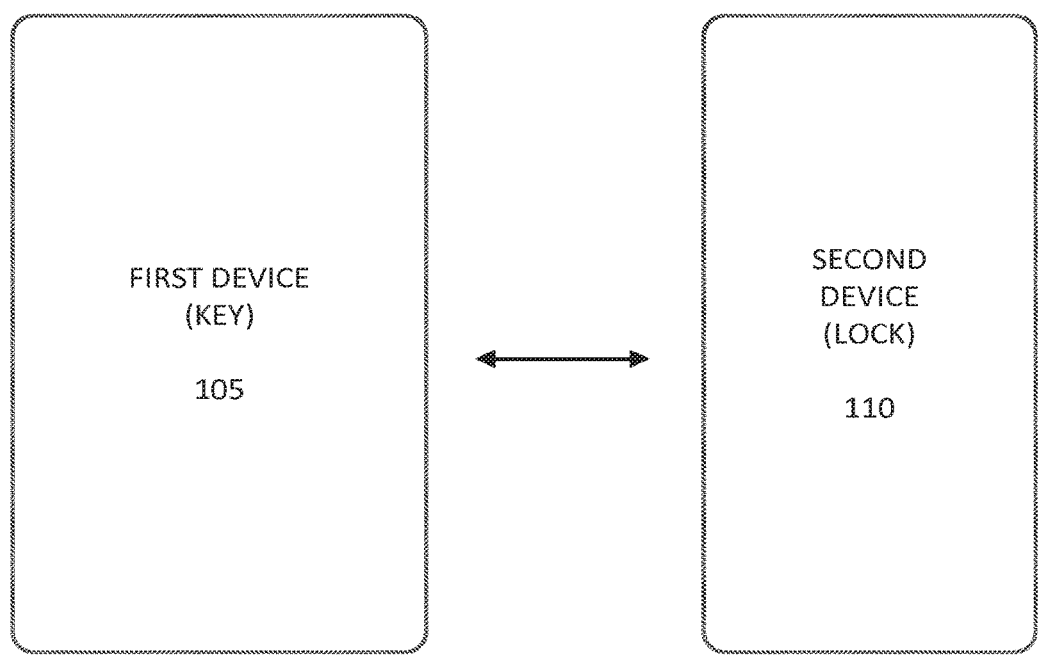
FIG. 1 shows an example configuration of two paired devices by which encrypted communication may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example configuration 100 of two paired devices by which encrypted communication may be implemented, arranged in accordance with at least some embodiments described herein. As depicted, configuration 100 includes, at least, a first device 105 and a second device 110 that may be brought into mutual proximity to each other. In some embodiments, first device 105 and second device 110 may be resource poor wireless devices that, for example, have no interfaces other than a wireless local area network, e.g., WLAN or WiFi interface. As referenced herein, a resource poor device may refer to a device of which communication partners may attribute little more than a basic communication interface, e.g., WiFi, Bluetooth or other NFC (near-field communication) protocol interface. That is, communication partners of a resource poor device may assume, whether true or not, that the resource poor device has what may be considered to be reduced processing capabilities in the current era of multi-functional devices; and therefore, in accordance with some embodiments, a resource poor device may refer to a device that lacks at least a display and/or a keyboard.

First device 105 and second device 110 may each be, for example, a mobile device or a non-mobile device. Non-limiting examples for either or both of first device 105 and second device 110 may include a remote key device, tablet computer, personal computer, video game console, cellular telephone (including smartphones), digital camera, digital audio player, a point-of-sale terminal, automated teller machine (ATM), home appliance, any one of a variety of resource-poor embedded devices configured as described herein, e.g., a door lock, a vending machine, and equivalents thereof. In the context of configuration 100, a user (which may be a person or actor that initiates and/or receives a communication signal) may hold, manipulate, or otherwise control one or both of first device 105 and second device 110, including the act of creating at least an initial contactless communication between first device 105 and second device 110.

First device 105 and second device 110 are depicted in the example configuration 100 of FIG. 1 as a contactless key device 105 and a contactless lock device 110 (e.g. wireless devices), but configuration 100 may pertain to any set of contactless devices configured to conduct encrypted communication therebetween. In at least one example embodiment, second device 110 may be a lock device for a rental vehicle (e.g., a door lock or an ignition lock) and first device 105 may be a key device configured to unlock second device 110. In accordance with another example embodiment, first device 105 may be a mobile device that hosts and executes an application to enable access to and to operate the rental vehicle.

In general, using a combination of proximity determination, trust establishment, and key generation protected with asymmetric encryption, a private key may be generated inside each device without ever being communicated between the two. For example, in accordance with at least one embodiment, first device 105 may be configured to pair with second device 110 to permit secure communication between first device 105 and second device 110 with an encryption key created independently by each device, and thus to enable or cause one or both devices to perform some action by virtue of the secure communication. In accordance with at least one embodiment, first device 105 may be a key device configured to pair with second device 110, which may be a vehicle door lock device. An established pairing of first device 105 (key device) and second device 110 (vehicle door lock device) may facilitate trusted interaction by which an unlock signal encrypted with the independently-created encryption key may be transferred securely from first device 105 to second device 110, with a result that second device 110 may be caused to unlock a vehicle door. In accordance with at least one other embodiment, second device 110 may be a vehicle lock in the vehicle door, and the pairing of first device 105 and second device 110 may be an exclusive pairing with first device 105 as the only device enabled to wirelessly cause second device 110 to unlock the vehicle door, and with second device 110 as the only device that first device 105 may wirelessly enable to unlock a vehicle door.

Figure 2:
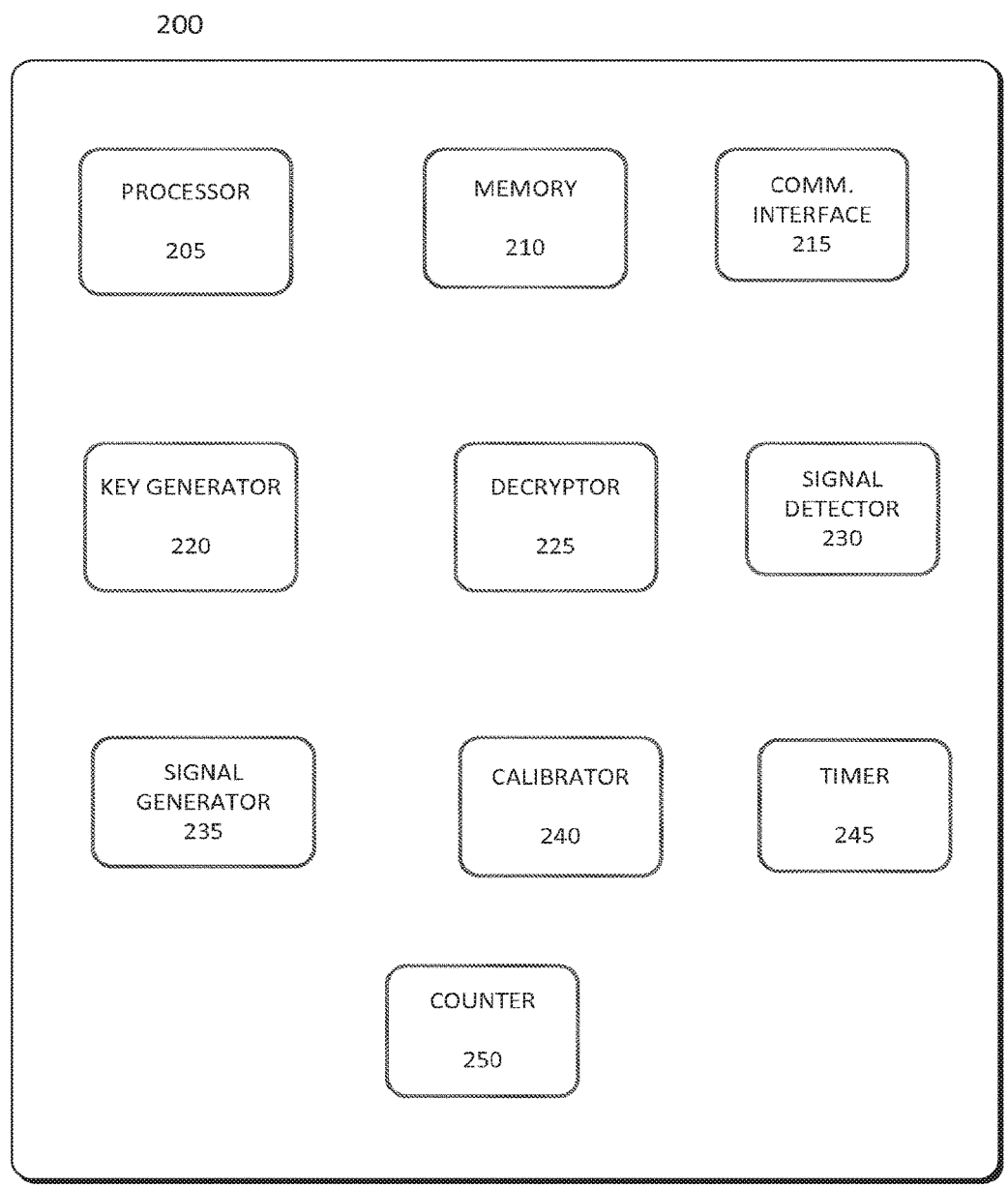
FIG. 2 shows an example configuration of a device by which various aspects of encrypted communication may be implemented, arranged in accordance with at least some embodiments described herein.

FIG. 2 shows an example configuration of a device 200 by which various aspects of encrypted communication may be implemented, arranged in accordance with at least some embodiments described herein. Device 200 may refer to either first device 105 or second device 110. As depicted, device 200 may be configured to include a processor 205, a memory 210, a communications interface 215, a key generator 220, a decryptor 225, a signal detector 230, a signal generator 235, a calibrator 240, a timer 245, and a counter 250. Any one or more of processor 205, memory 210, communications interface 215, key generator 220, decryptor 225, signal detector 230, signal generator 235, calibrator 240, timer 245, and counter 250 may be implemented as hardware, software, firmware, or any combination thereof. Further, device 200 is not limited to such components, as modifications may be made by combining two or more of the components described herein, eliminating at least one of the components, adding further components, substituting components, or even having various components assuming sub-processing roles accorded to other components in the following description.

Processor 205 may refer to one or more components configured, designed, and/or programmed to control one or more operations of device 200.

Memory 210 may refer to any hardware and/or one or more virtual components configured to store, e.g., executable instructions and/or data. For example, memory 210 may include system memory configured to store, inter alia, instructions for execution by one or more embodiments of processor 205 and the data with which those instructions work in carrying out functions on device 200. Memory 210 may also, or alternatively, include one or more storage devices to store data for various purposes, including retrieval to system memory for use by the one or more embodiments of processor 205.

Communications interface 215 may refer to one or more components configured, designed and/or programmed to conduct or facilitate communication with another device (e.g., with the other of first device 105 or second device 110). In some embodiments, communications interface 215 may be a wireless interface or an NFC interface, but such are merely examples of a suitable external communications interface.

Key generator 220 may refer to one or more components configured, designed and/or programmed to generate an encryption key by which information may be encrypted for secure transfer between device 200 and another suitably configured device (e.g., with the other of first device 105 and second device 110). With reference to first device 105 and second device 110, first device 105 and second device 110 both include a key generator 220, and therefore both first device 105 and second device 110 may generate its own encryption key, thus avoiding the need to transfer a corresponding key to the other device. Details of key generator 220 are further discussed below with respect to FIG. 3.

Decryptor 225 may refer to one or more components configured, designed and/or programmed to decrypt encrypted data received by and/or stored on device 200.

Signal detector 230 may refer to one or more components configured, designed and/or programmed to detect one or more communication signals. For example, signal detector 230 may be configured to detect a locator signal from another device. In accordance with such example, signal detector 230 of either of first device 105 and second device 110 may be configured to detect a locator signal from the other device. Signal detector 230 may be configured to detect other communication signals, as discussed further below.

Signal generator 235 may refer to one or more components configured, designed and/or programmed to generate one or more communication signals. For example, signal generator 235 corresponding to first device 105 may be configured to generate an acknowledgement signal to be sent to second device 110 in response to signal detector 230 corresponding to first device 105 detecting a locator signal from second device 110. Signal generator 235 may be configured to generate other communication signals, as discussed further below.

Calibrator 240 may refer to one or more components configured, designed and/or programmed to calibrate signal detector 230. In accordance with some embodiments, calibrator 240 may be configured to adjust the sensitivity (e.g., the lowest detectable signal amplitude) of signal detector 230 corresponding to first device 105 as needed to match a sensitivity of a corresponding signal detector of second device 110 attempting to communicate or communicating with first device 105. Calibrator 240 may be configured to alternatively or additionally adjust one or more other aspects of signal detector 230 to match a corresponding aspect of a signal detector of another device.

Timer 245 may refer to one or more components configured, designed, and/or programmed to measure, output, or control timing of one or more components of device 200. In accordance with at least one embodiment, an encryption key is not infinitely usable. That is, embodiments described herein may be designed for the efficacy of an encryption key to expire or otherwise be unusable after a finite time or instances of encryption. Timer 245 may be configured to invalidate the encryption key after a preset time has elapsed from its creation. Other modes of limiting the uses of the encryption key are also contemplated within the spirit and scope of the description herein.

Alternatively, or in addition, timer 245 may be implemented to determine the end of effectiveness of a communication signal generated by signal generator 235. For example, after a predetermined time has elapsed, signal generator 235 may stop generating locator signals and the locator signal transmitting device may ignore any subsequent attempt to respond to the locator signal. As another example, after a predetermined time has elapsed, the locator signal transmitting device may automatically enter a standby, sleep or hibernation mode, or power OFF entirely. Thus, timer 245 may facilitate power saving.

Counter 250 may refer to one or more components configured, designed, and/or programmed to count a number of times that a communication signal is generated by signal generator 235. As a non-limiting example, counter 250 may be implemented to end the generation of encrypted signals between paired devices (e.g., between first device 105 and second device 110 after having been paired in accordance with embodiments described herein) after a predetermined number of such signals have been generated. Thus, counter 250 may terminate the time of access to a rental vehicle in accordance with a rental agreement.

Figure 3:
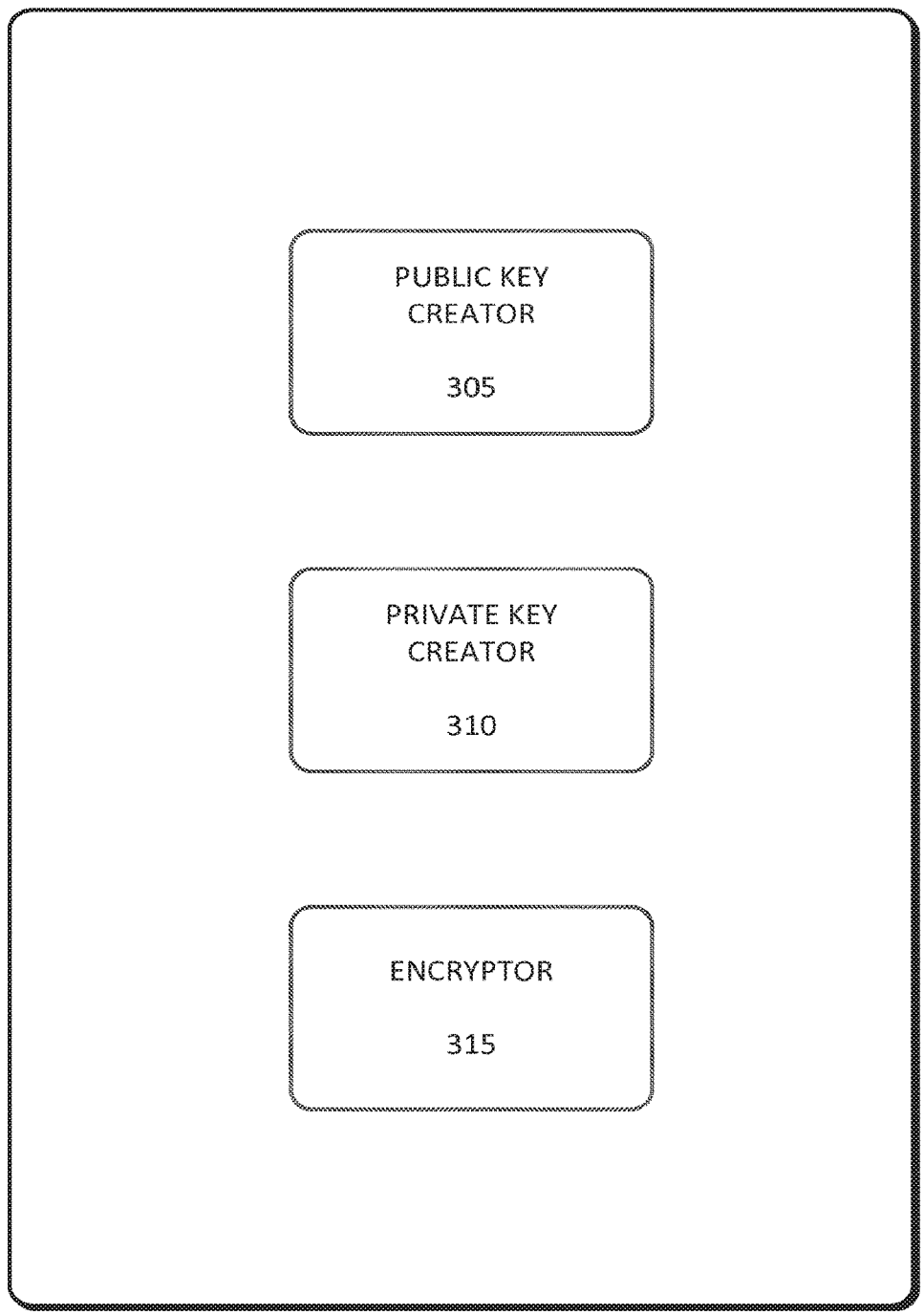
FIG. 3 shows an example configuration of a key generator that may be implemented in a device by which at least aspects of encrypted communication may be implemented, arranged in accordance with at least some embodiments described herein.

FIG. 3 shows an example configuration of key generator 220 that may be implemented in a device by which at least aspects of encrypted communication may be implemented, arranged in accordance with at least some embodiments described herein. As depicted, key generator 220 may include a public key creator 305, a private key creator 310, and an encryptor 315. Further, key generator 220 may be implemented as hardware, software, and/or firmware. Further still, key generator 220 is not limited to such components, as obvious modifications may be made by combining two or more of the components described herein, eliminating at least one of the components, adding further components, substituting components, or even having various components assuming sub-processing roles accorded to other components in the following description.

Public key creator 305 may refer to one or more components configured, designed, and/or programmed to generate at least portions of a public encryption key, also referred to as a "public key," by which unencrypted information may be encrypted by another, suitably-configured device, e.g., by second device 110 for secure transfer to first device 105, even though the public key may be readily detectable or even known. That is, in accordance with at least one example, unencrypted information that is encrypted by second device 110 by use of a public key of first device 105 may not be decrypted except by use of a matching private encryption key, also referred to as a "private key", of first device 105.

In some example embodiments, communications between first device 105 and second device 110 may be encrypted using public key encryption. For instance, a public key corresponding to first device 105 may be published or provided to second device 110 without compromising security, while an availability of the matching private key to a user that is not authorized to read the thus-encrypted information may compromise security. In this context, "unencrypted" may refer to information that is not encrypted by use of the aforementioned public key corresponding to first device 105.

Private key creator 310 may refer to one or more components configured, designed, and/or programmed to generate at least portions of a private key by which information encrypted by another device (e.g., by second device 110) by use of a public key (e.g., a public key corresponding to first device 105) may be decrypted. That is, information encrypted by second device 110 by use of the public key corresponding to first device 105 may not be decrypted except by use of a matching private key of first device 105. As noted, a public key corresponding to first device 105 may be published or provided to second device 110 without compromising security of a communication from first device 105 to second device 110, while availability of a matching private key to anyone not authorized to read the thus-encrypted information may compromise security.

Encryptor 315 may refer to one or more components configured, designed and/or programmed to encrypt information by use of, e.g., a private key or a public key. For example, by use of a public key of, e.g., second device 110, encryptor 315 of first device 105 may encrypt unencrypted information for secure transfer to second device 110. In this context, "unencrypted" may refer to information that is not encrypted by use of a public key of second device 110.

Figure 4:
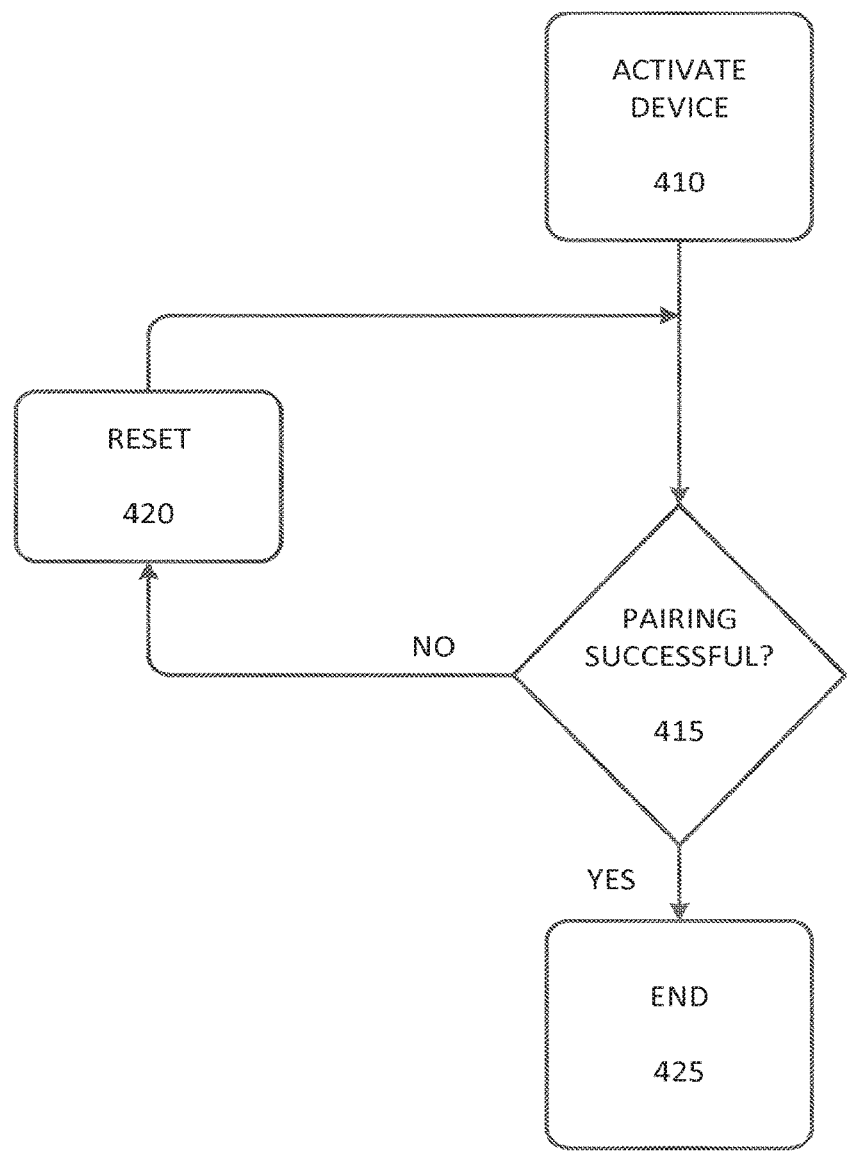
FIG. 4 shows a processing flow illustrating an example processing flow by which a first device may attempt to be paired with a second device to implement at least various aspects of encrypted communication, in accordance with at least some embodiments described herein.

FIG. 4 shows processing flow 400 illustrating an example processing flow by which a first device may attempt to be paired with a second device to implement at least various aspects of encrypted communication, in accordance with at least some embodiments described herein. Processing flow 400 may be implemented by first device 105 and second device 110. Further, processing flow 400 may include one or more operations, actions, or functions depicted by one or more blocks 410, 415, 420, and 425. Although illustrated as discrete blocks, various blocks may be divided into additional blocks, combined into fewer blocks, or eliminated, depending on the desired implementation.

Further, as set forth above, configuration 100, and therefore processing flow 400 as well, may each pertain to a device, e.g., first device 105, that is configured to facilitate encrypted communication with another device, e.g., second device 110, using a key generated for encrypting future communication. Using a combination of proximity determination, trust establishment, and key generation protected with asymmetric encryption, a private key may be generated inside each device without ever being communicated between the two. Processing flow 400 may begin at block 410.

Block 410 (Activate Device) may refer to processor 205 corresponding to second device 110 being activated as another device, e.g., first device 105, attempts to pair with second device 110 for the exchange of information or data. As referenced herein, activate may refer to, by way of non-limiting example, a device powering ON, waking up from a sleep or hibernation mode, exiting standby mode, etc. Further, such activation of the device may be internally or externally triggered. Decision block 415 may follow block 410.

Decision block 415 (Pairing Successful?) may refer to first device 105 and/or second device 110 determining whether they have been successfully paired together to exchange encrypted information or data. If either device determines that the pairing with the other device is not successful, i.e., "NO", decision block 415 may be followed by block 420; else, if each device determines that the pairing is successful, i.e., "YES", decision block 415 may be followed by block 425.

Block 420 (Reset) may refer to second device 110 being reset upon a negative determination, i.e., "NO," at decision block 415. In some embodiments, block 420 may be followed by block 415, reverting processing flow 400 for another attempted pairing. Reverting processing flow 400 for another attempt may address a need for the pairing, for example. However, in some embodiments, block 420 may be followed by a return of second device 110 to its pre-activation state before block 410. In the pre-activation state, second device may be in a standby, sleep or hibernation mode, or powered OFF entirely, in examples described above. Returning second device 110 to its pre-activation state may facilitate power saving, for example. Second device 110 may be activated again, by way of non-limiting example, powering ON, waking up from a sleep or hibernation mode, exiting standby mode, etc. Such activation of the device may be internally or externally triggered. A subsequent status of first device 105 may be moot in regard to the subsequent status of second device 110.

Block 425 (End) may refer to the end of processing flow 400 upon a positive determination, i.e., "YES" at decision block 415. That is, processing flow 400 may end upon a successful pairing of first device 105 and second device 110 being enabled for secure communication with each other.

Figure 5:
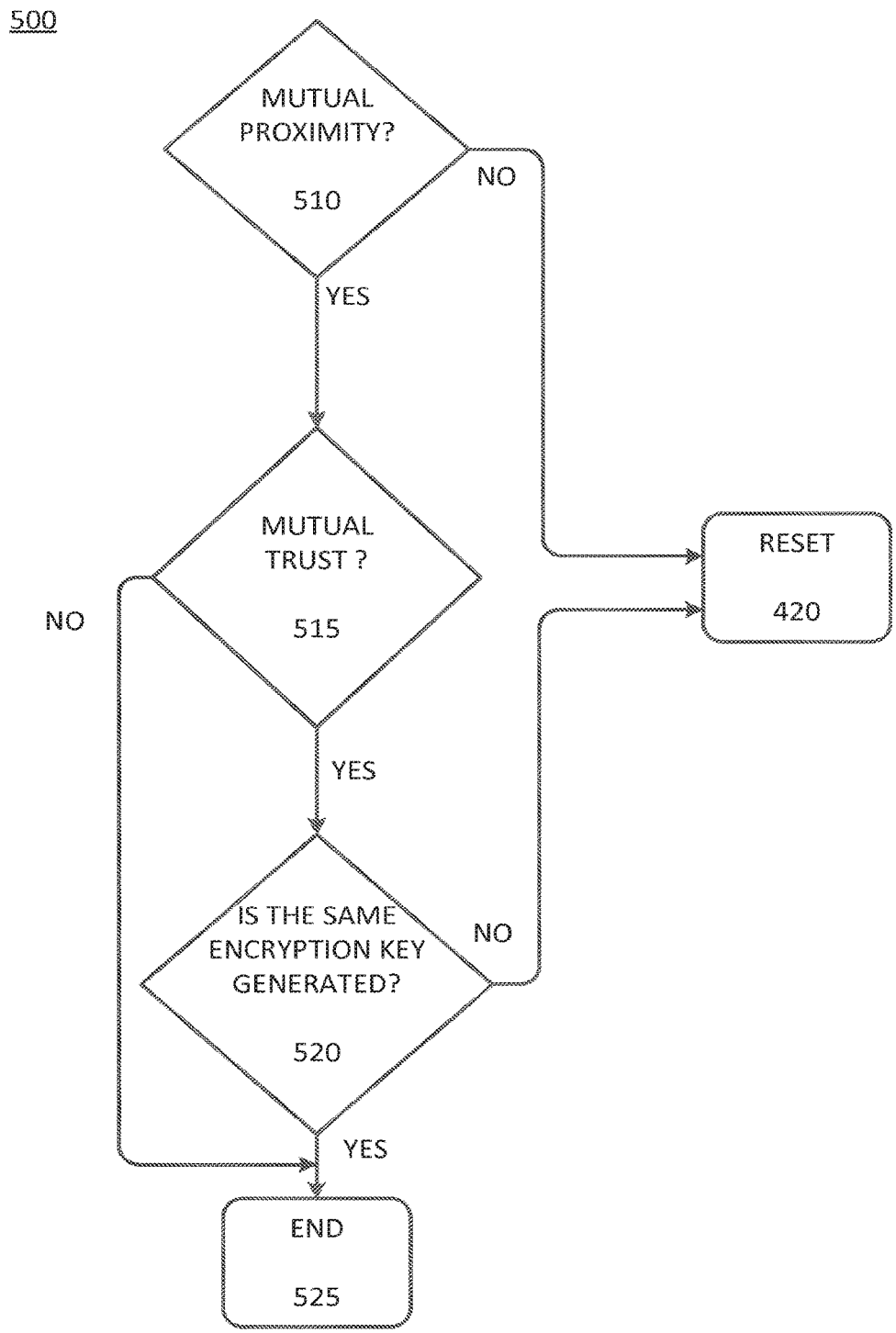
FIG. 5 shows a processing flow illustrating further details of the processing flow corresponding to FIG. 4, in accordance with at least some embodiments described herein.

FIG. 5 shows processing flow 500 illustrating further details of decision block 415 of processing flow 400, in accordance with at least some embodiments described herein. Processing flow 500 may correspond to determining whether a pairing between two devices is successful as described above with reference to processing flow 400. Similar to the description above of processing flow 400, processing flow 500 may be implemented by first device 105 and second device 110. Further, processing flow 500 may include one or more operations, actions, or functions depicted by one or more blocks 510, 515, 520, and 525. Although illustrated as discrete blocks, various blocks may be divided into additional blocks, combined into fewer blocks, or eliminated, depending on the desired implementation. Processing flow 500 may begin at decision block 510.

Decision block 510 (Mutual Proximity?) may refer to processors 205 corresponding to first device 105 and second device 110 determining whether the devices have mutual proximity to each other. If processor 205 of at least one of first device 105 or second device 110 determines that that there is no mutual proximity, i.e., "NO", decision block 510 may be followed by block 420 (Reset) for second device 110, as described above with reference to processing flow 400 (a subsequent status of first device 105 may be moot in regard to the subsequent status of second device 110); else, if each processor 205 determines that there is mutual proximity, i.e., "YES", decision block 510 may be followed by decision block 515.

Decision block 515 (Mutual Trust?) may refer to processors 205 corresponding to first device 105 and second device 110 determining whether mutual trust has been established with the other device, as a foundation for future encrypted communication. If processor 205 of at least one of first device 105 or second device 110 determines that there is no mutual trust, i.e., "NO", decision block 515 may be followed by block 525 (End) may follow decision block 515, as a pairing may not occur without mutual trust, in accordance with the embodiments described herein; else, if each processor 205 determines that there is mutual trust, i.e., "YES", decision block 515 may be followed by decision block 520.

Decision block 520 (Is the Same Encryption Key Generated?) may refer to processors 205, corresponding respectively to first device 105 and second device 110, determining whether a same encryption key has been generated, without passing this key between them. For example, in accordance with at least one embodiment, a first test message encrypted with an encryption key created by private key creator 310 of first device 105 may be transmitted by first device 105 to second device 110; and a second test message encrypted with an encryption key created by private key creator 310 of second device 110, independently of creation of the encryption key created by first device 105, may be transmitted by second device 110 to first device 105. Each processor 205 of first device 105 and second device 110 may independently determine that the first test message and second test message are identical within a preset tolerance. If both processors independently determine that the first test message and the second test message are identical, i.e., "YES", decision block 520 may be followed by block 525; else, if processor 205 of at least one of first device 105 or second device 110 determines that the first test message and the second test message are not identical, i.e., "NO," decision block 520 may be followed by block 420 (Reset) for second device 110, as described above with reference to processing flow 400. A subsequent status of first device 105 may be moot in regard to the subsequent status of second device 110.

Block 525 (End) may refer to the end of processing flow 500. If both processors independently determine that the first test message and the second test message are identical, i.e., "YES" at decision block 520. That is, a pairing of first device 105 and second device 110 has been created by a combination of proximity determination, trust establishment, and encryption key generation protected with asymmetric encryption generated inside each device without ever being communicated between the two.

Figure 6:
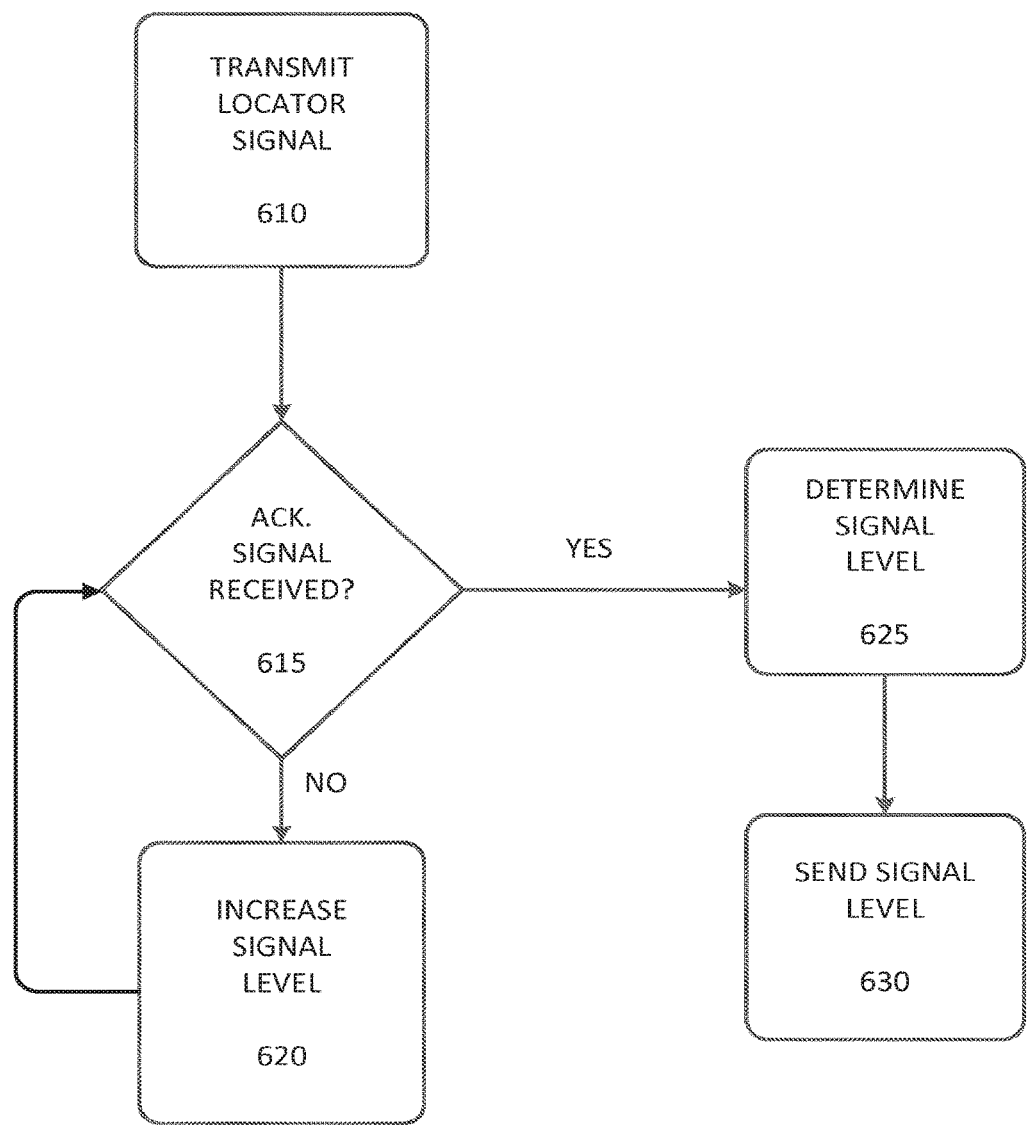
FIG. 6 shows a processing flow illustrating further details of the processing flow illustrated in FIG. 5, in accordance with at least some embodiments described herein.

FIG. 6 shows processing flow 600 illustrating further details of decision block 510 of processing flow 500, in accordance with at least some embodiments described herein. Processing flow 600 may correspond to determining whether first device 105 and second device 110 have mutual proximity to each other as described above with reference to processing flow 500. Processing flow 600 may include one or more operations, actions, or functions depicted by one or more blocks 610, 615, 620, 625, and 630. Although illustrated as discrete blocks, various blocks may be divided into additional blocks, combined into fewer blocks, or eliminated, depending on the desired implementation. FIG. 6 is described as it pertains to second device 110, as an example, although processing flow 600 may pertain to both second device 110 and first device 105, respectively. Processing flow 600 may begin at block 610.

In the following example utilized to describe processing flow 600, second device 110 may be alternatively referred to as a "locator signal transmitting device" and first device 105 may be alternatively referred to as an "acknowledging device." However, it is to be understood that processing flow 600 also pertains to first device 105 as the locator signal transmitting device and second device 110 as the acknowledging device.

Block 610 (Transmit Locator Signal) may refer to signal generator 235 of a locator signal transmitting device, e.g., second device 110, generating and transmitting, via communications interface 215, a locator signal at an initial signal level. It may be contemplated to set the initial signal level to zero amplitude or another level that is expected to be well below a detection threshold of an acknowledging device, e.g., first device 105.

In some embodiments, the locator signal may be a radio frequency, e.g., WiFi, signal. The frequency and signal level may depend on conditions of the communication, including but not limited to the configurations of the locator signal transmitting device, e.g., second device 110, and the acknowledging device, e.g., first device 105; the signal propagating medium; ambient noise; surrounding environment; detector sensitivity; or signal quality. Furthermore, the signal may take any form, including but not limited to analog, digital, continuous, pulse, etc. Decision block 615 may follow block 610.

Decision block 615 (Acknowledgement Signal Received?) may refer to signal detector 230 corresponding to the locator signal transmitting device, e.g., second device 110, detecting an acknowledgement signal from signal generator 235 corresponding to the acknowledging device, e.g., first device 105, that the locator signal was received. The acknowledgement signal may be a wireless signal generated at the frequency and signal level detected by first device 105. The frequency and signal level may depend on conditions of the communication, including but not limited to the configurations of the locator signal transmitting device and the acknowledging device, the signal propagating medium, ambient noise, surrounding environment, detector sensitivity, or signal quality. Furthermore, the signal may take any form, including but not limited to analog, digital, continuous, pulse, etc. If signal detector 230 corresponding to second device 110 does not detect an acknowledgement signal, i.e., "NO", decision block 615 may be followed by block 620; else, if signal detector 230 detects an acknowledgement signal, i.e., "YES", decision block 615 may be followed by block 625.

Block 620 (Increase Signal Level) may refer to signal generator 235 corresponding to second device 110 increasing the signal level (e.g., transmission power) of the locator signal. The signal level increase may be stepwise, continuous, or any other form of increase or combination of these. Processing flow 600 may include a return to repeat decision block 615 and block 620 until signal detector 230 corresponding to second device 110 receives an acknowledgement signal from signal generator 235 corresponding to first device 105. In some embodiments, by way of example only, it may be contemplated that approximately ten signal level increases may occur before signal detector 230 detects an acknowledgement signal from signal generator 235. If signal detector 230 detects an acknowledgement signal from signal generator 235, decision block 615 may be followed by block 625.

Block 625 (Determine Signal Level) may refer to processor 205 corresponding to second device 110 determining the locator signal level at the time of detecting the acknowledgement signal from first device 105. Block 630 may follow block 625.

Block 630 (Send Signal Level) may refer to signal generator 235 corresponding to second device 110 sending the signal level determined in block 625 to first device 105.

As noted above, processing flow 600 may also pertain to first device 105 as the locator signal transmitting device and second device 110 as the acknowledging device. Thus, at block 625, in a similar way to processor 205 corresponding to second device 110 determining the locator signal level at the time of receiving the acknowledgement signal from first device 105, processor 205 corresponding to first device 105 may also determine its locator signal level at the time of detecting an acknowledgement signal from second device 110, and send the signal level determined in block 625 to second device 110.

Figure 7:
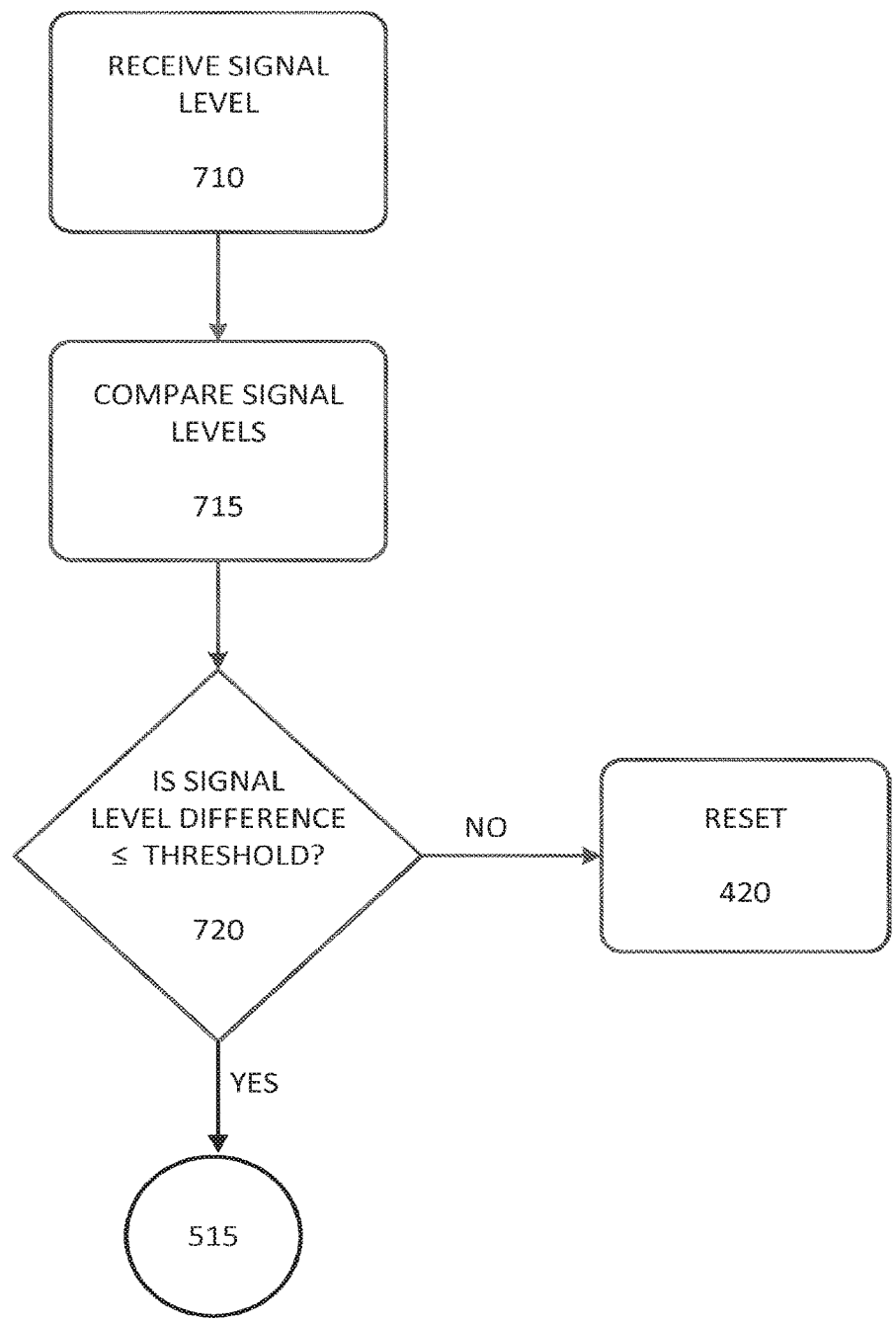
FIG. 7 shows a processing flow illustrating further details of the processing flow illustrated in FIG. 5, in accordance with at least some embodiments described herein.

FIG. 7 shows processing flow 700 illustrating further details of decision block 510 of processing flow 500, in accordance with at least some embodiments described herein. In combination with processing flow 600, processing flow 700 may further correspond to determining whether first device 105 and second device 110 have mutual proximity to each other as described above with reference to processing flow 500. As noted above, processing flow 600 may pertain to both first device 105 and second device 110 acting as locator signal transmitting device and acknowledging device. Processing flow 700 likewise may pertain to both first device 105 and second device 110, operating independently. However, for the sake of explanation only, processing flow 700 is described as it pertains to first device 105.

Processing flow 700 may include one or more operations, actions, or functions depicted by one or more blocks 710, 715, and 720. Although illustrated as discrete blocks, various blocks may be divided into additional blocks, combined into fewer blocks, or eliminated, depending on the desired implementation. Processing flow 700 may begin with block 710.

Block 710 (Receive Signal Level) may refer to signal detector 230 corresponding to first device 105 receiving the signal level determined by second device 110 in block 625 and sent to first device 105 in block 630. Block 715 may follow block 710.

Block 715 (Compare Signal Levels) may refer to processor 205 corresponding to first device 105 comparing the signal level received in block 710 with the signal level as determined by signal detector 230 corresponding to first device 105 that corresponds to the acknowledgement signal transmitted by second device 110. Decision block 720 may follow block 715.

Decision block 720 (Is Signal Level Difference Threshold?) may refer to processor 205 corresponding to first device 105 determining whether the comparison of the two signal levels in block 715 shows that a difference between the two signal levels is less than or equal to a preset threshold. In some embodiments, the threshold may be preset in a program running on processor 205 corresponding to first device 105. If processor 205 determines that the difference between the two signal levels is not less than or equal to a present threshold, i.e., "NO", decision block 720 may be followed by block 420 (Reset) for second device 110, as described above with reference to processing flow 400. That is, if processor 205 determines that a difference between the signal levels compared in block 715 is not less than or equal to a preset threshold, second device 110 may be reset and decision block 415 may follow block 420. Processing then reverts to processing flow 400. A subsequent status of first device 105 may be moot in regard to the subsequent status of second device 110. However, if processor 205 determines that a difference between the signal levels is less than or equal to a preset threshold, i.e., "YES", mutual proximity is established and decision block 720 may be followed by decision block 515. Processing may revert to processing flow 500.

In some embodiments, processors 205 of both first device 105 and second device 110 make the determination as to whether a difference between the signal levels is less than or equal to a preset threshold. Thus, in some embodiments, if processors 205 of both first device 105 and second device 110 that a difference between the signal levels compared in block 715 is less than or equal to a preset threshold, mutual proximity is established.

As noted, processing flow 700 pertains also to second device 110. That is, FIG. 6 and FIG. 7 pertain to both second device 110 and first device 105. Thus, first device 105 may be the locator signal transmitting device and second device 110—may be the acknowledging device.

Moreover, as first device 105 may receive from second device 110 the signal level corresponding to the acknowledgment signal sent by first device 105 upon detecting the locator signal transmitted by second device 110, e.g., block 710; compare the two signal levels, e.g., block 715; and determine whether a difference between the two signal levels is less than or equal to the preset threshold, e.g., decision block 720, so may second device 110 receive from first device 105 the signal level corresponding to the acknowledgment signal sent by second device 110 upon detecting the locator signal transmitted by first device 105, compare the two signal levels, and determine whether a difference between the two signal levels is less than or equal to the preset threshold. In both instances, if the difference between the two signals is not less than or equal to the preset threshold, processing flow 700 may end and processing flow 400 may proceed with block 420 following decision block 720.

The establishment of mutual proximity between first device 105 and second device 110 may satisfy a portion of the process illustrated by processing flow 500 shown in FIG. 5. Thus, if mutual proximity is established in decision block 510, processing flow 500 may continue with decision block 515.

Figure 8:
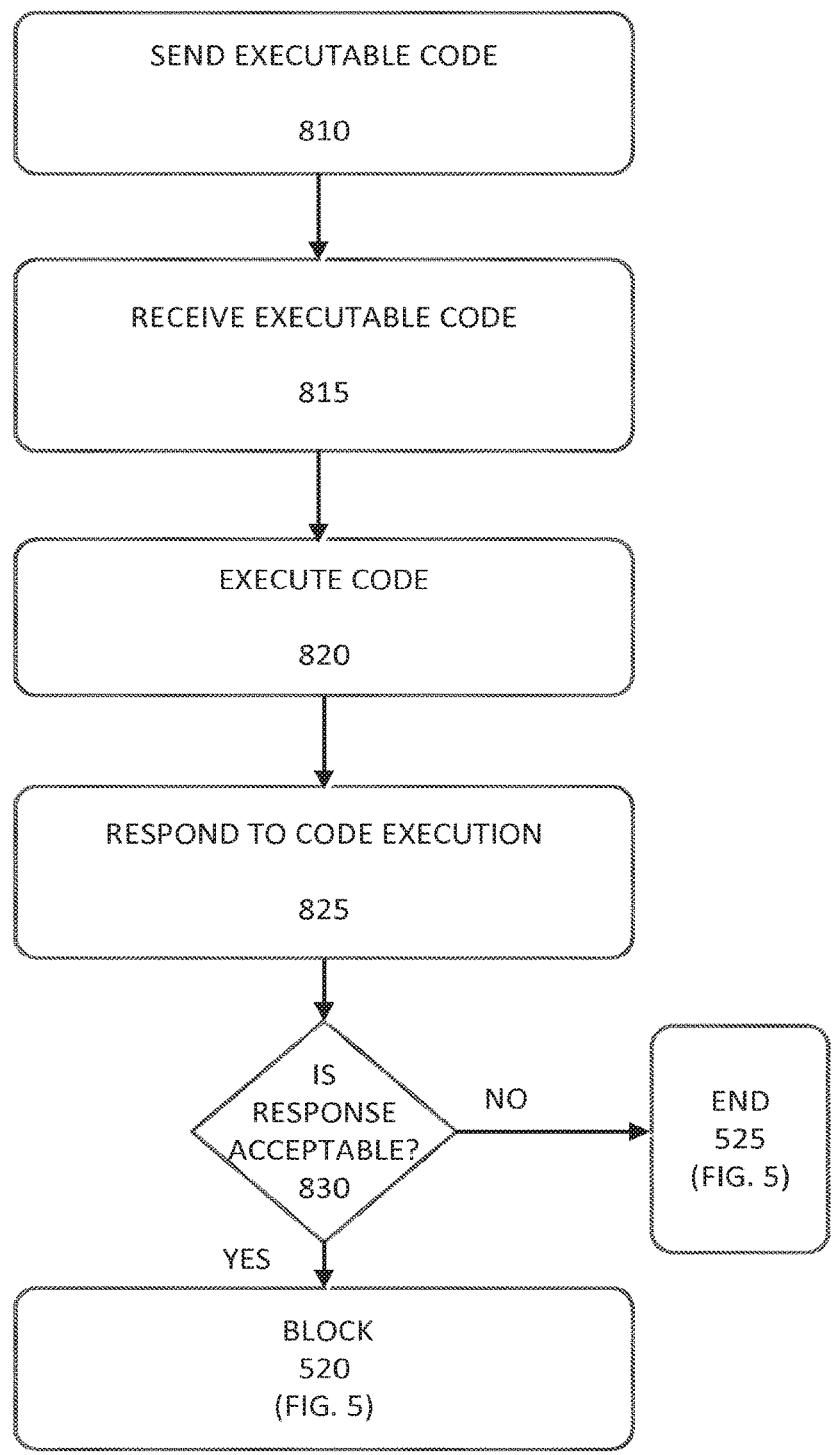
FIG. 8 shows a processing flow illustrating further details of the processing flow illustrated in FIG. 5, in accordance with at least some embodiments described herein.

FIG. 8 shows processing flow 800 illustrating further details of decision block 515 of processing flow 500, in accordance with at least some embodiments described herein. In some embodiments, mutual trust is not established between first device 105 and second device 110. To establish mutual trust, first device 105 attempts to validate second device 110 and second device permits and responds to the attempt. Thus, processing flow 600 may correspond to determining whether first device 105 and second device 110 have mutual trust with each other as described above with reference to processing flow 500.

Processing flow 800 may include one or more operations, actions, or functions depicted by one or more blocks 810, 815, 820, 825, and 830. Although illustrated as discrete blocks, various blocks may be divided into additional blocks, combined into fewer blocks, or eliminated, depending on the desired implementation. Processing flow 800 may pertain to both first device 105 and second device 110, operating independently. However, for the sake of explanation only, processing flow 800 is described as it pertains to first device 105. Processing flow 800 may begin at block 810.

Block 810 (Send Executable Code) may refer to signal generator 235 corresponding to first device 105 sending executable code to signal detector 230 corresponding to second device 110. The code may be designed to evoke a response by second device 110. In some embodiments, the code may be an application program stored or generated in first device 105. For example, first device 105 may be a smartphone and the code may be produced by a mobile app stored in the smartphone. In some embodiments, the application program may be compatible with multiple platforms or operating systems; however, some randomness may be incorporated to differentiate the application program among at least some devices including first device 105.

For example, if an eavesdropper intercepts the (unknown to it) executable code sent by signal generator corresponding to first device 105, the eavesdropper may be expected to reject the code as being potentially dangerous, akin to an unknown virus. On the other hand, second device 110 may expose itself to the executable code as part of the process of determining whether mutual trust may be established.

In accordance with at least one embodiment, second device 110 may be an automated teller machine (ATM) and first device 105 may be a smartphone attempting to establish secure communication with the ATM for the purpose of, e.g., making a cash withdrawal. In accordance with at least one other embodiment, second device 110 may be a hotel room door lock and first device 105 may be a key device for unlocking the door. In accordance with at least one further embodiment, second device 110 may be a door lock for a rental vehicle and first device 105 may be a key device for unlocking the vehicle door. In any of these embodiments, the executable code itself may be a token of authority or access issued by a bank, hotel, or rental vehicle provider, respectively. In these and other embodiments, as a token of authority or access, the executable code may be created with a time limit on its effectiveness (e.g., for a set duration or between certain hours of the day). In some embodiments, blocks of executable code can be combined, for example by nesting, to increase security or even define a chain of authority with respect to the second device. By way of a non-limiting example, in a hospital environment, a chief administrator may issue a multiple-nested plurality of tokens, each of which authorizes a different level of user with a different level of access to, e.g., certain medical equipment, supplies, or records. In other non-limiting examples, such nested tokens may provide hierarchical access to a bank or secure building, or to various internal offices, vaults, or equipment in accordance with employment status or position. Without the code, an eavesdropper may be defeated in an attempt to establish mutual trust with second device 110. Block 815 may follow block 810.

Block 815 (Receive Executable Code) may refer to signal detector 230 corresponding to second device 110 receiving the executable code from signal generator 235 corresponding to first device 105. Block 820 may follow block 815.

Block 820 (Execute Code) may refer to processor 205 corresponding to second device 110 executing the code received from first device 105. In this regard, second device 110 may be unable to provide an acceptable response unless the code is executed and the execution generates an acceptable response. "Acceptable" may refer to a response that is intended to be evoked by execution of the code. Furthermore, as part of the trust being offered on the part of second device 110, second device 110 may permit execution of the code by processor 205 corresponding to second device 110 to obtain information about second device 110. This information may reveal, e.g., configuration details of second device 110. In some embodiments, the information may be the response. Block 825 may follow block 820.

Block 825 (Respond To Code Execution) may refer to signal generator 235 corresponding to second device 110 sending to first device 105 a response to the code execution. Decision block 830 may follow block 825.

Decision block 830 (Is Response Acceptable?) may refer to processor 205 corresponding to first device 105 determining whether the response by second device 110 to the code execution is a response that is acceptable by processor 205. At least one non-limiting example of an acceptable response may be the return of configuration details of second device 110, e.g., model of processor or type and amount of memory. If processor 205 determines that the response by second device 110 to the code execution is not acceptable, i.e., "NO", mutual trust is not established and decision block 830 may be followed by block 525 (FIG. 5; End). However, if processor 205 determines that the response by second device 110 to the code execution is acceptable, i.e., "YES", mutual trust is established and decision block 830 may be followed by decision block 515. Processing may revert to processing flow 500.

The establishment of mutual trust between first device 105 and second device 110 may satisfy another portion of the process illustrated by processing flow 500 shown in FIG. 5. Thus, if mutual proximity is established in decision block 510 and mutual trust is established in decision block 515 between first device 105 and second device 110, processing flow 500 may continue with decision block 520.

Figure 9:
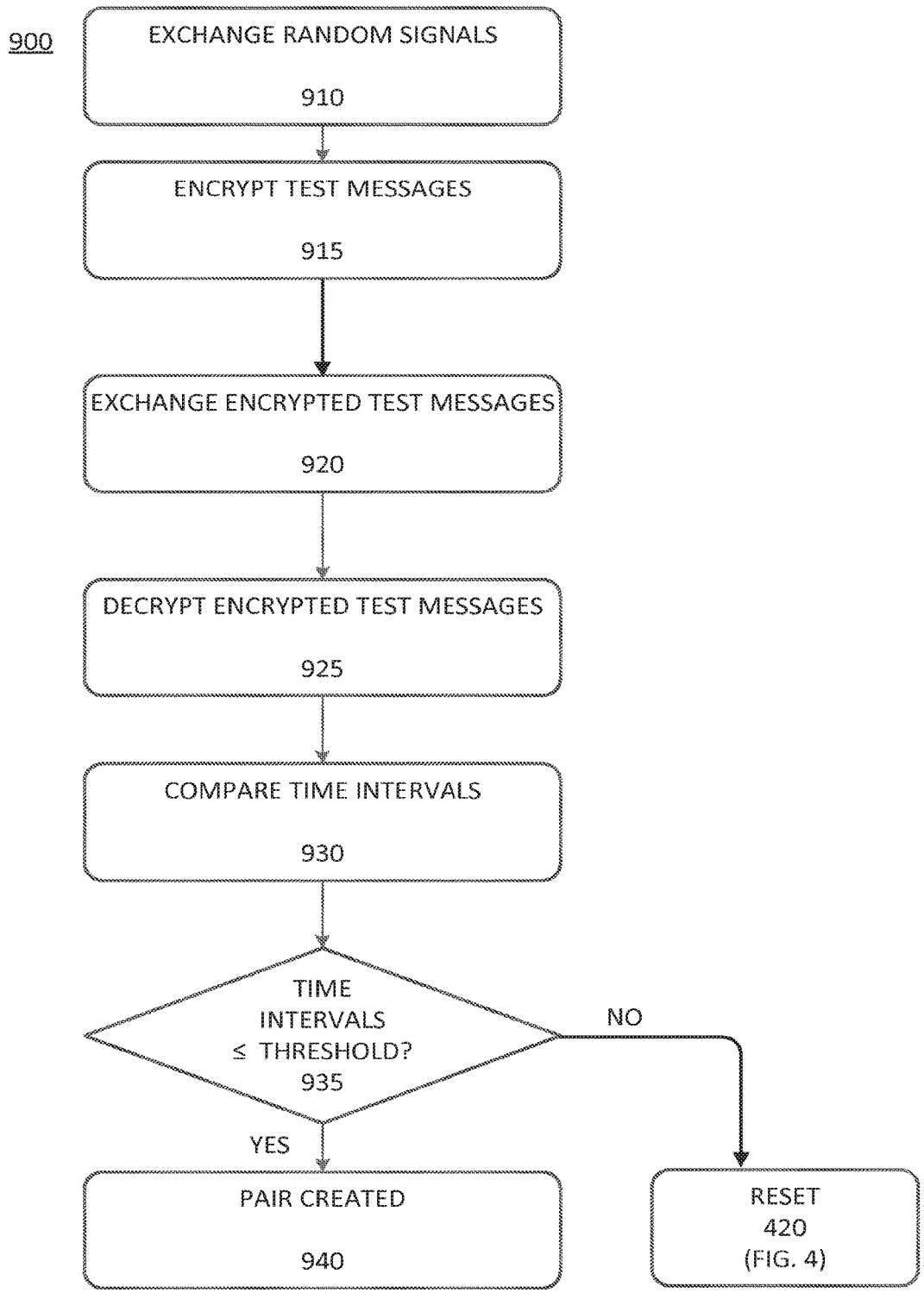
FIG. 9 shows a processing flow illustrating further details of the processing flow illustrated in FIG. 5, in accordance with at least some embodiments described herein.

FIG. 9 shows processing flow 900 illustrating further details of decision block 520 of processing flow 500, in accordance with at least some embodiments described herein. Processing flow 900 may correspond to two devices, e.g., first device 105 and second device 110, independently generating encryption keys which, if identical, may be used for future encrypted communication. Processing flow 900 may pertain to both first device 105 and second device 110.

Processing flow 900 may include one or more operations, actions, or functions depicted by one or more blocks 910, 915, 920, 925, 930, 935, and 940. Although illustrated as discrete blocks, various blocks may be divided into additional blocks, combined into fewer blocks, or eliminated, depending on the desired implementation. Processing flow 900 may begin at block 910.

Block 910 (Exchange Random Signals) may refer to signal generator 235 of each of first device 105 and second device 110 generating and transmitting a random signal of increasing signal level. The random signals need not be transmitted or received simultaneously or in any particular order by first device 105 and second device 110. It may be contemplated to set the initial signal level to zero amplitude or another level that is expected to be well below a detection threshold of a receiving device. The signal level increase may be stepwise, continuous, or any other form of increase or combination of these. At some point during the transmission of each of the random signals, the signal level may be sufficiently high that signal detectors 230 of first device 105 and second device 110 detect the random signal transmitted by second device 110 and first device 105, respectively. However, transmission of each random signal individually may continue until a predetermined time, level, number of pulses (in the case of a pulse signal), or other terminating factor is reached. By way of non-limiting example, each of the increasing random signals may be transmitted for about ten seconds.

In some embodiments, the random signals may be radio frequency (for example, WiFi) signals, although no limitation is intended. Indeed, the signals need not be of the same frequency. The frequency and signal levels may be depend on conditions of the communication, including but not limited to the configurations of first device 105 and second device 110, the signal propagating medium, ambient noise, surrounding environment, detector sensitivity, or signal quality. Furthermore, the signals may take any form, including but not limited to analog, digital, continuous, pulse, etc. Block 915 may follow block 910.

Block 915 (Encrypt Test Messages) may refer to encryptors 315 of first device 105 and second device 110 encrypting test messages using a public key of the other device. That is, encryptor 315 of first device 105 may encrypt a test message with a public key of second device 110 and vice versa. Processor 205 corresponding to second device 110 may generate the public key of second device 110 in accordance with randomly generating a pair of large prime numbers and multiplying them together, with one of the factors being the private key of second device 110. Similarly, processor 205 corresponding to first device 105 may generate the public key of first device 105 in accordance with randomly generating a pair of large prime numbers and multiplying them together, with one of the factors being the private key of first device 105. The magnitude of the prime numbers is not limited, but the larger the number, the more difficult will be discovery of the private keys.

The test message encrypted by encryptor 315 corresponding to first device 105 may include a time interval from signal detector 230 corresponding to first device 105 detecting the random signal received from second device 110 until sending its encrypted test message. Correspondingly, the test message encrypted by encryptor 315 corresponding to second device 110 may include a time interval from signal detector 230 corresponding to second device 110 detecting the random signal received from first device 105 until sending its own encrypted test message. Block 920 may follow block 915.

Block 920 (Exchange Encrypted Test Messages) may refer to first device 105 and second device 110 generating and exchanging the encrypted test messages. Block 925 may follow block 920.

Block 925 (Decrypt Encrypted Test Messages) may refer to decryptors 225 corresponding to first device 105 and second device 110 decrypting the encrypted test message that each receives from the other. Block 930 may follow block 925.

Block 930 (Compare Time Intervals) may refer to processors 205 corresponding to first device 105 and second device 110 comparing the time intervals encrypted in the test message that each sent and received. Decision block 935 may follow block 930.

Decision block 935 (Is Time Interval Difference Threshold?) may refer to processors 205 corresponding to first device 105 and second device 110 determining whether the comparison of the two time intervals shows that a difference between the two time intervals is less than or equal to a preset threshold. In some embodiments, the threshold may be preset in a program running on processors 205 corresponding to first device 105 and second device 110. If either processor 205 corresponding to first device 105 or second device 110 determines that the comparison of the two time intervals shows that a difference between the two time intervals is not less than or equal to a preset threshold, i.e., "NO", decision block 935 may be followed by block 420 (Reset) for second device 110, as described above with reference to processing flow 400 (a subsequent status of first device 105 may be moot in regard to the subsequent status of second device 110.); else, if both processors 205 corresponding to first device 105 and second device 110 determine that the comparison of the two time intervals shows that a difference between the two time intervals is less than or equal to a preset threshold, i.e., "YES", an identical encryption key has been independently created by both first device 105 and second device 110.

The creation of an identical encryption key independently by both first device 105 and second device 110 may satisfy another portion of the process illustrated by processing flow 500 shown in FIG. 5. Thus, if mutual proximity is established in decision block 510, mutual trust is established in decision block 515, and an identical encryption key is created by first device 105 and second device 110 in decision block 520, a pair has been created of first device 105 and second device 110, and block 525 may follow decision block 935. Processing may then revert to processing flow 500.

Creation of a "pair" may refer to first device 105 and second device 110 being created as a pair. That is, the identical encryption key has been successfully created, a bond may be created between first device 105 and second device 110 by virtue of the identical encryption key, which may be used for future secure communications. In some embodiments, once a bond is created and a pair thus formed, one or both of first device 105 and second device 110 may not attempt or respond to an attempt to bond with another device.

Although various embodiments have been described above, further embodiments may be realized by modifications thereof. For example, although in accordance with at least one embodiment, once a bond is created and a pair thus formed, one or both of first device 105 and second device 110 may not attempt or respond to an attempt to bond with another device, it may be contemplated that bonding and pairing may be exclusive or non-exclusive. Further, in some embodiments, once the bond is broken (e.g., by reset of second device 110 during a bonding attempt or a pairing reaching a predetermined duration as determined by, e.g., timer 245), a new pair or bond may be made. Other examples may limit one or both of first device 105 and second device 110 to a preset number of pairings as determined by, e.g., counter 250.

Some non-limiting examples of non-exclusive pairings may include multiple keys/one lock, such as when a vehicle rental customer is given one key device while the vehicle rental company has a second key device to retain the ability to enter its rental vehicle, a hotel guest is given one key device while the hotel has a second key device to retain the ability to enter a room, or multiple roommates have equal entry capabilities to an apartment. Additionally or alternatively, a single key may be paired separately with multiple locks to enable, e.g., a vehicle rental company to use a single key to open all vehicles in its inventory.

Figure 10:
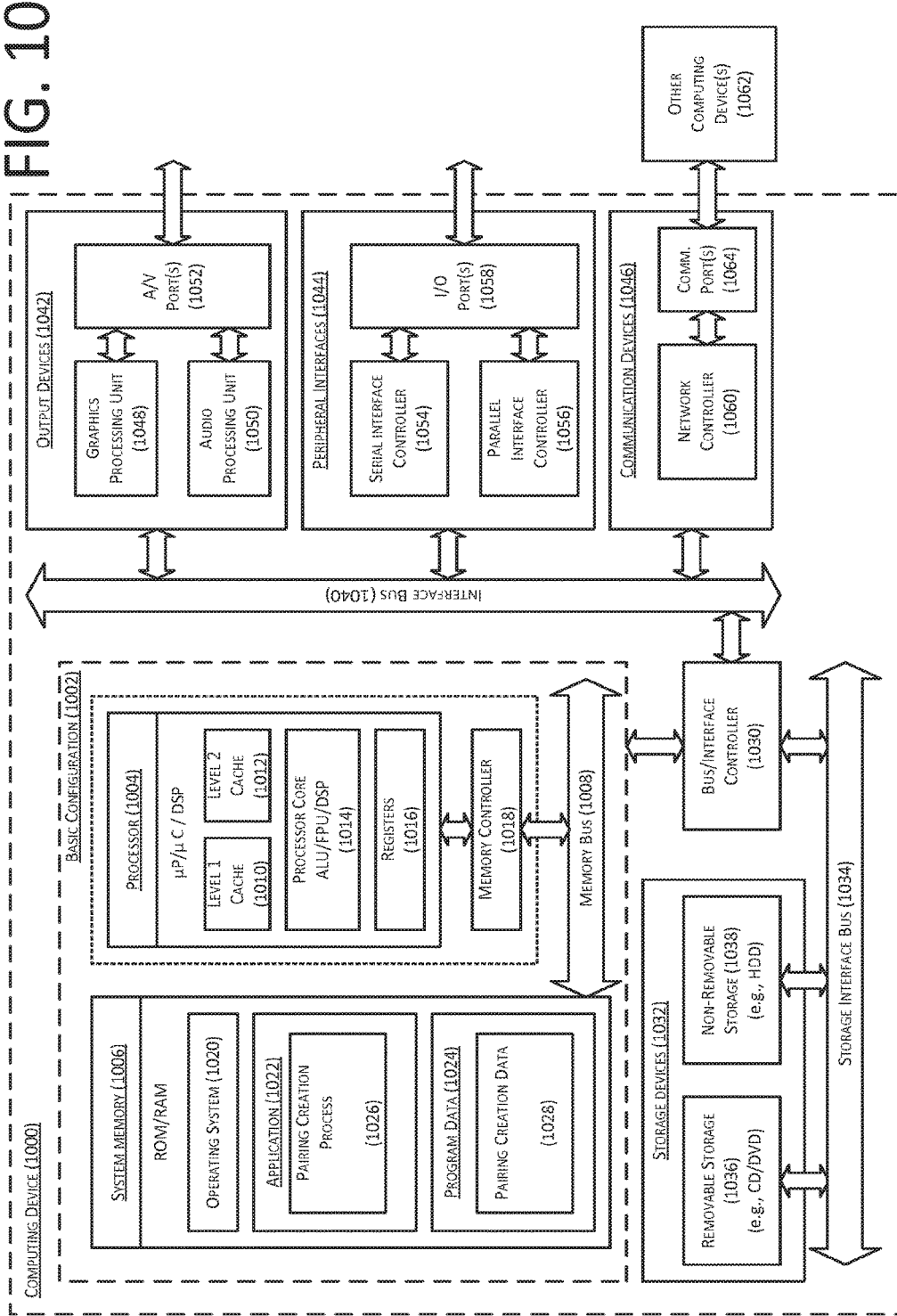
FIG. 10 shows a block diagram illustrating an example computing device by which various aspects of encrypted communication between paired devices may be implemented.

FIG. 10 shows a block diagram illustrating an example computing device by which various examples of encrypted communication between paired devices may be implemented, arranged in accordance with at least some embodiments described herein.

In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include a pairing creation process 1026 that is arranged to perform the functions as described herein including those described with respect to processing flow 400 of FIG. 4, processing flow 500 of FIG. 5, processing flow 600 of FIG. 6, processing flow 700 of FIG. 7, processing flow 800 of FIG. 8, and processing flow 900 of FIG. 9. Program data 1024 may include pairing creation data 1028 that may be useful for operation with pairing creation process 1026 as described herein. In some embodiments, application 1022 may be arranged to operate with program data 1024 on operating system 1020 such that implementations of pairing creation may be provided as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A device pairing system, comprising:
a first device and a second device, wherein each of the first device and the second device includes one or more processors and a signal generator, and wherein each of the first device and the second device is configured to:
assure mutual proximity between the first device and the second device by exchange of a series of locator signals, generated via the signal generator, at progressively increasing signal levels, and by transmission of an acknowledgment signal, generated via the signal generator, in response to detection of a locator signal output in the exchange of the series of locator signals, wherein the signal levels of the locator signals are progressively increased until the acknowledgement signal is received, by one of the first device and the second device, from other of the first device and the second device that received the locator signal output;
mutually validate the first device and the second device via the one or more processors; and
generate secret keys via the one or more processors to ensure a private exchange of data between the mutually proximate and the mutually validated first device and second device.

2. The device pairing system of claim 1, wherein each of the first device and the second device is further configured to perform an interaction that includes transmission of a signal encrypted using the generated secret keys, and wherein the signal facilitates modification of a state of one of the first device and the second device that receives the signal.

3. The device pairing system of claim 1, wherein:
the first device is a key device, and
the second device is a lock device configured to be opened by the key device when the key device and the lock device are mutually proximate and mutually validated.

4. The device pairing system of claim 1, wherein each of the first device and the second device is further configured to:
verify pairing between the first device and the second device by exchange of a series of verification signals at the progressively increasing signal levels and transmission of a test message signal, in response to detection of a verification signal output by one of the first device and the second device that receives the verification signal from other of the first device and the second device,
wherein each of the test message signals includes information regarding a time interval between the detection of the verification signal and output of the test message signal;
encrypt the test message signals using public keys of the first device and the second device, respectively;
decrypt the test message signals using private keys of the first device and the second device, respectively; and
verify the pairing thereof based on similarity of the time intervals.

5. The device pairing system of claim 1, wherein the series of locator signals and the acknowledgement signal are wireless signals.

6. The device pairing system of claim 4, wherein:
the first device is a key device, and
the second device is a lock device configured to be opened by the key device when the key device and the lock device are mutually proximate and mutually validated.

7. A device, comprising:
at least one communication interface configured to exchange signals with another device; and
a pairable component that includes one or more processors and a signal generator, wherein the pairable component is configured to:
assure the another device of mutual proximity with the device by exchange, via the at least one communication interface, of a series of locator signals generated via the signal generator, which include output of the series of locator signals at progressively increasing signal levels until receipt of an acknowledgment signal, which acknowledges receipt of one of the series of locator signals, from the another device;
verify, via the at least one communication interface, pairing of the device with the another device; and
generate, via the one or more processors, a secret key to ensure a private exchange of data between the mutually proximate and paired device and the another device.

8. The device of claim 7, wherein the device is a lock device and the another device is a key device configured to open the lock device when the lock device and the key device are mutually proximate and when the lock device is validated.

9. The device of claim 7, wherein the pairable component is configured to:
verify the pairing by reception of a test message signal from the another device, in response to detection of a verification signal,
wherein the test message signal, output by the device, contains information of a time interval from receipt of the test message signal from the another device until output of the test message signal by the device,
wherein the pairable component further includes an encryptor and a decryptor, and
wherein the pairable component is further configured to:
encrypt, via the encryptor, the test message signal, output by the device, using a public key of the another device; and
decrypt, via the decryptor, the test message signal received from the another device using a private key of the another device.

10. The device of claim 7, wherein the series of locator signals and the acknowledgment signal are wireless signals.

11. The device of claim 9, wherein:
the device is a lock device; and
the another device is a key device configured to open the lock device when the lock device and the key device are mutually proximate and when the lock device is validated.

12. A device pairing method, comprising:
transmitting, by a first device, a plurality of first locator signals, generated via a signal generator of the first device, at progressively increasing signal levels;
receiving, by the first device from a second device, a first acknowledgement signal that includes an acknowledgement receipt of one of the plurality of first locator signals, wherein transmitting the plurality of first locator signals comprises transmitting a series of locator signals at the progressively increasing signal levels until receipt of the first acknowledgement signal from the second device;
receiving, by the first device from the second device, a plurality of second locator signals at progressively increasing signal levels;
transmitting, by the first device, a second acknowledgement signal, generated via the signal generator, which includes acknowledgement receipt of one of the plurality of the second locator signals received from the second device;
determining, by the first device, proximity of the first device to the second device, based on the first acknowledgement signal received by the first device and based on the second acknowledgement signal output by the first device; and
generating, by the first device, a secret key, based on the determined proximity, to ensure a private exchange of data between the first device and the second device.

13. The device pairing method of claim 12, wherein:
the first device is a lock device, and
the second device is a key device configured to open the lock device when paired with the lock device.

14. The device pairing method of claim 12, wherein the plurality of first locator signals, the plurality of second locator signals, the first acknowledgement signal, and the second acknowledgement signal are wireless signals.

15. The device pairing method of claim 12, further comprising:
transmitting, by the first device, a signal encrypted using the generated secret key, wherein the signal facilitates modification of a state of the second device.

16. The device pairing method of claim 12, further comprising:
controlling, by the first device, at least one of:
a usable timing of the generated secret key, and an end of effectiveness of the plurality of first locator signals.

17. A device pairing method, comprising:

exchanging, by a first device, at least two wireless signals at progressively increasing levels, and at least two acknowledgement signals with a second device, wherein the at least two wireless signals and the at least two acknowledgement signals are generated via a signal generator, and wherein the exchanged at least two acknowledgement signals comprise at least a first acknowledgement signal received by the first device and a second acknowledgement signal output by the first device;

determining, by the first device, whether a difference between a first level of the first acknowledgement signal received by the first device and a second level of the second acknowledgement signal output by the first device is less than or equal to a threshold value;

determining, by the first device, proximity of the first device to the second device based on a determination that the difference is less than or equal to the threshold value; and generating, by the first device, a secret key based on the determined proximity, to ensure a private exchange of data between the first device and the second device.

18. The device pairing method of claim 17, further comprising:

transmitting, by the first device, a signal encrypted using the generated secret key, wherein the signal facilitates modification of a state of the second device.

19. The device pairing method of claim 17, further comprising:

controlling, by the first device, at least one of:
 a usable timing of the generated secret key, and
 an end of effectiveness of the at least two wireless signals.

* * * * *